United States Patent [19]

Okazaki

[11] Patent Number: 5,801,939
[45] Date of Patent: Sep. 1, 1998

[54] PRECISION POSITIONING CONTROL APPARATUS AND PRECISION POSITIONING CONTROL METHOD

[75] Inventor: Yuichi Okazaki, Tsuchiura, Japan

[73] Assignee: Agency of Industrial Science & Technology, Ministry of International Trade & Industry, Tokyo, Japan

[21] Appl. No.: 609,611

[22] Filed: Mar. 1, 1996

[30] Foreign Application Priority Data

Mar. 3, 1995 [JP] Japan .................................. 7-070798

[51] Int. Cl.$^6$ .............................................. G05B 11/18
[52] U.S. Cl. .................. 364/167.01; 318/592; 318/593; 318/560
[58] Field of Search ................. 364/167.1; 318/560, 318/592, 632, 590, 591, 593

[56] References Cited

U.S. PATENT DOCUMENTS

| | | | |
|---|---|---|---|
| 4,988,936 | 1/1991 | Schneider | 318/632 |
| 5,119,005 | 6/1992 | Tsai et al. | 318/618 |
| 5,262,707 | 11/1993 | Okazaki et al. | 318/592 |

FOREIGN PATENT DOCUMENTS

| | | |
|---|---|---|
| 60-146650 | 8/1985 | Japan . |
| 4-368676 | 12/1992 | Japan . |
| 5-325211 | 12/1993 | Japan . |
| 6-124459 | 5/1994 | Japan . |

OTHER PUBLICATIONS

Autumn 1991 Congress of Japanese Society of Precision Engineering, (pp. 411–412), Oct. 1, 1991.

"Specialist Committee for Survey of Industrial Application of Robust Digital Control and Digital Control" Electrical Association Technical Report (Section II), No. 378, Aug. 1991.

Osamu Horiuchi, et al., "A Study on High Precision Positioning for the Wheel Head of a Cylindrical Grinder", The 1992 Symposium of the Society of Grinding Engineers, Sep. 11, 1992.

Primary Examiner—James P. Trammell
Assistant Examiner—Demetra R. Smith
Attorney, Agent, or Firm—Oblon, Spivak, McClelland, Maier & Neustadt, P.C.

[57] ABSTRACT

A precision positioning control apparatus includes a coarse positioner, a fine positioner, a displacement totalizer for totaling the displacements of the two positioners, a total displacement detector for producing a total displacement signal, a comparator for producing an error signal, a coarse positioner adjuster for adjusting the error signal and inputting the adjusted signal to the coarse positioner, and fine positioner adjuster for adjusting the error signal and inputting the adjusted signal to the fine positioner. The coarse position adjuster includes a gain element, a transfer element, a limitter, an integrator, a gain adjuster and an adder.

3 Claims, 7 Drawing Sheets

PRECISION POSITIONING CONTROL APPARATUS AND PRECISION POSITIONING CONTROL METHOD

BACKGROUND OF THE INVENTION

1. Field of the Invention

This invention relates to a positioning control apparatus and a precision positioning control method enabling high-precision positioning with high-speed response over a broad range of movement as required in machine tools, semiconductor production equipment, various types of surface profilers, data storage equipment and the like.

2. Description of the Prior Art

High movement control resolution and high-speed response are required in the stages used in large-area direct photolithography systems, various types of surface profilers and the like.

Most conventional transfer systems requiring precision positioning over a large range of movement have a movable table driven by a servo motor through a ball screw or the like. When high positioning precision is required, it is achieved by use of closed loop control, specifically by using a displacement sensor to measure the movement of the movable table with high precision, comparing the measured value with the command value to determine the positioning error and driving the movable table to eliminate the error. To achieve an improvement in positioning accuracy in this control it is necessary to increase the precision of the displacement sensor and raise the servo gain. The degree to which the servo gain can be increased is limited, however, owing to the resonance characteristic and other properties of the movable table mechanism to be controlled. In addition, the mechanism of the movable table being controlled generally involves friction and play. As these factors introduce nonlinearity, only limited control precision can be achieved. Since the mass of the movable members is generally large, moreover, the response speed is limited.

On the other hand, high displacement resolution and high response can be achieved by driving an elastically supported movable stage using a piezoelectric, electrostriction or magnetostriction element, but the range of moment is ordinarily at most several hundred micrometers.

Figure 4:
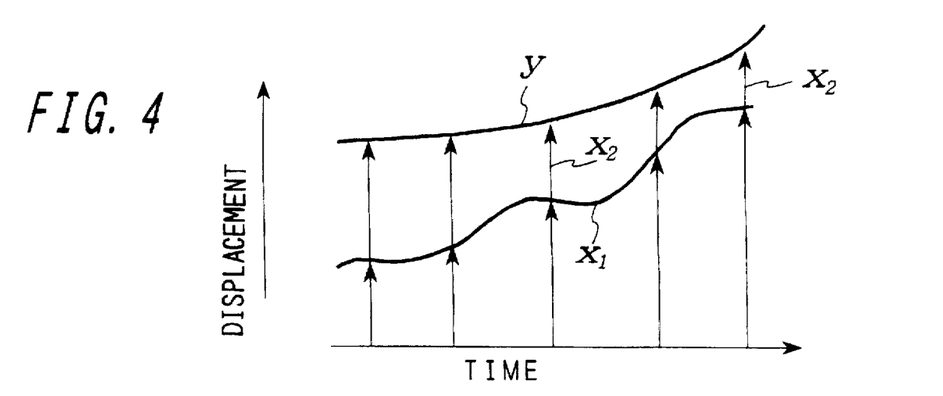
FIG. 4 is a graph showing how the displacements of a fine positioner and a coarse positioner vary with time in an ordinary composite servo system.

Owing to these circumstances, numerous composite servo systems (precision positioning control apparatuses) have been proposed for enabling high-precision, high-response positioning control over a large range of movement. Such a system is a combination of a coarse positioner of limited positioning resolution and precision but having a large range of movement and a fine positioner having a small range of movement but excellent positioning resolution and high response speed. The composite system is engineered to take maximum advantage of the respective merits the two constituent systems. The general concept of the composite servo system is shown by the graph of FIG. 4. As can be seen from this graph, the coarse positioner produces a rough displacement $x_1$ including a large amount of error and the fine positioner produces a small displacement $x_2$ for correcting the error. When combined, the large and small displacements provide a total displacement y that closely approximates the desired displacement.

Composite servo systems are widely utilized in semiconductor production equipment, machine tools, access servo systems in disk drives for computers and other data processing equipment, robot arms, multistage carriages and the like. Although these applications have different requirements as regards positioning control resolution, response speed, range of movement, system drive method etc., the technology involved is basically similar.

Composite servo systems are of two general types, the mode switching type and the coarse-fine coordinating type. The mode switching type is designed to home in on the desired position rapidly by using the coarse positioner to move near the desired position and then using the fine positioner for precision positioning. The coarse-fine coordinating type is designed to conduct continuous positioning control by coordinating the coarse positioner and the fine positioner to enable continuous positioning by both, without switching between operating modes. The precision positioning control apparatus according to this invention is a composite servo system of the coarse-fine coordinating type.

The following are the coarse-fine coordinating type servo systems that have been proposed in the prior art.

(1) Access servo system for magnetic disk drive (See Japanese Patent Public Disclosure Hei 4-368676)

Figure 5:
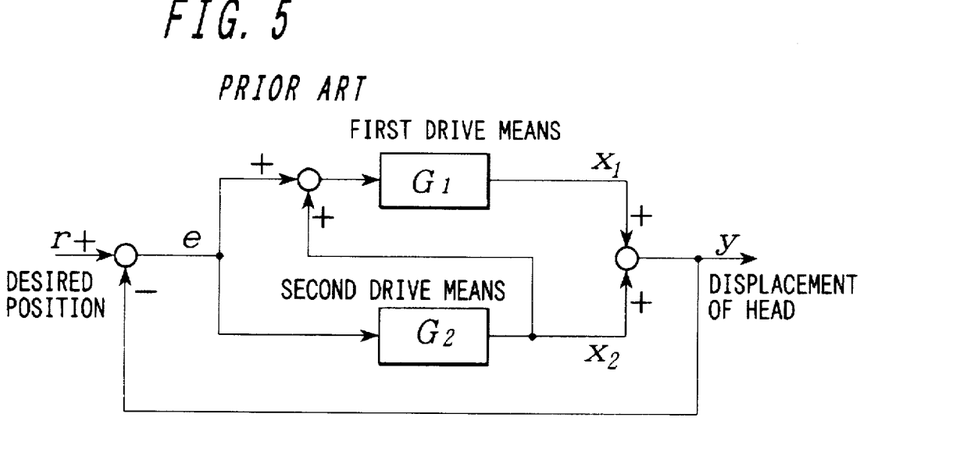
FIG. 5 is a block diagram showing a first example of a conventional composite servo system.

A block diagram of this system is shown in FIG. 5. In the control by this system, the error e of the head displacement amount y relative to the desired head position r is sent as a command signal to both of first and second drive means $G_1$ and $G_2$ and the displacement amount of the second drive means $G_2$ is simultaneously added to the command signal of the first drive means $G_1$.

(2) Light spot positioning apparatus (See Japanese Patent Public Disclosure Hei 5-325211)

Figure 6:
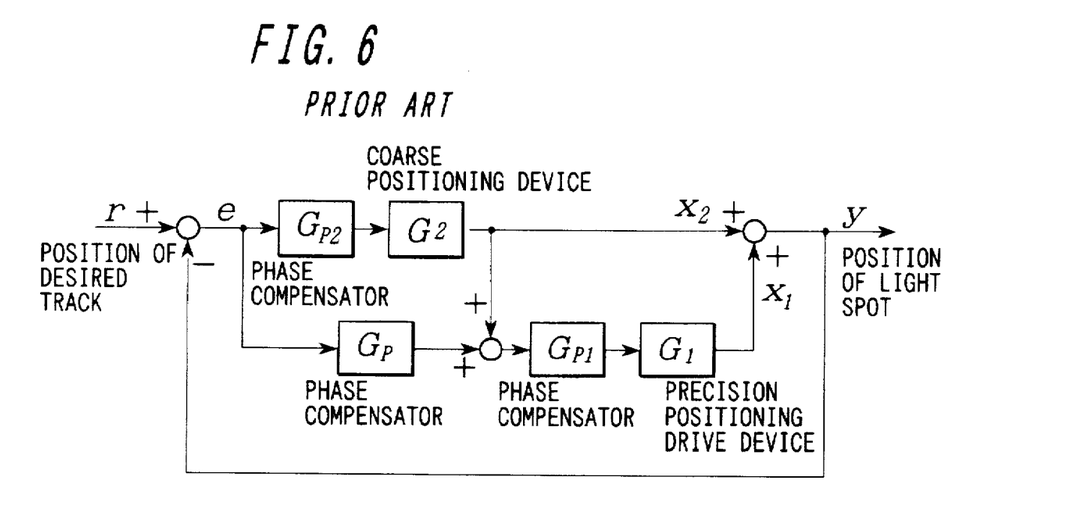
FIG. 6 is a block diagram showing a second example of a conventional composite servo system.

A block diagram of this apparatus is shown in FIG. 6. An error e representing the difference between the position r of the desired track and the light spot is sent through a phase compensator $G_{P2}$ and applied to a coarse positioning drive device $G_2$ as an input signal, the sum obtained by adding double the displacement of the coarse positioning drive device and the error e passed through a phase compensator $G_P$ is sent through a phase compensator $G_{P1}$ and applied to a precision positioning drive device $G_1$ as an input signal, track tracking is conducted, and the light spot position y is positioned at the position r of the desired track.

(3) Light spot positioning apparatus (See Japanese Patent Public Disclosure Hei 6-124459)

Figure 7:
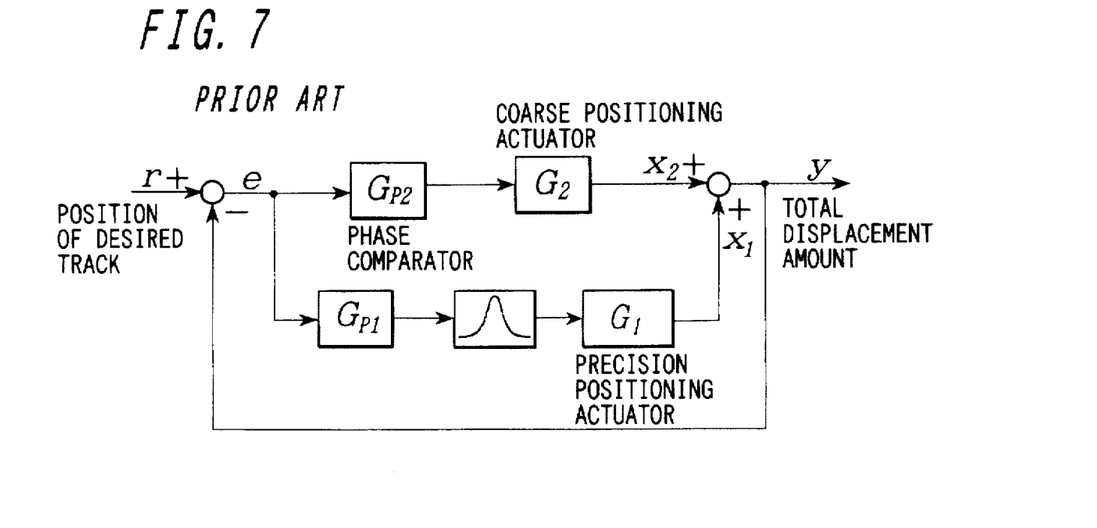
FIG. 7 is a block diagram showing a third example of a conventional composite servo system.

A block diagram of this apparatus is shown in FIG. 7. The error e between the desired track position r and the light spot position y is sent through a phase compensator $G_{P2}$ and applied to a coarse positioning actuator $G_2$ as a drive input and is also sent through a compensator $G_{P1}$ and means for locally increasing the gain K in frequency domain and applied to a precision positioning actuator $G_1$ as drive input. The crossover frequency of the servo system of the coarse positioning actuator $G_2$ is set higher than the rotational frequency of the spindle for rotating the optical disk and lower than the base frequency of the precision positioning actuator $G_1$.

(4) Precision positioning control system (See Japanese Patent Public Disclosure Sho 60-146650)

Figure 8:
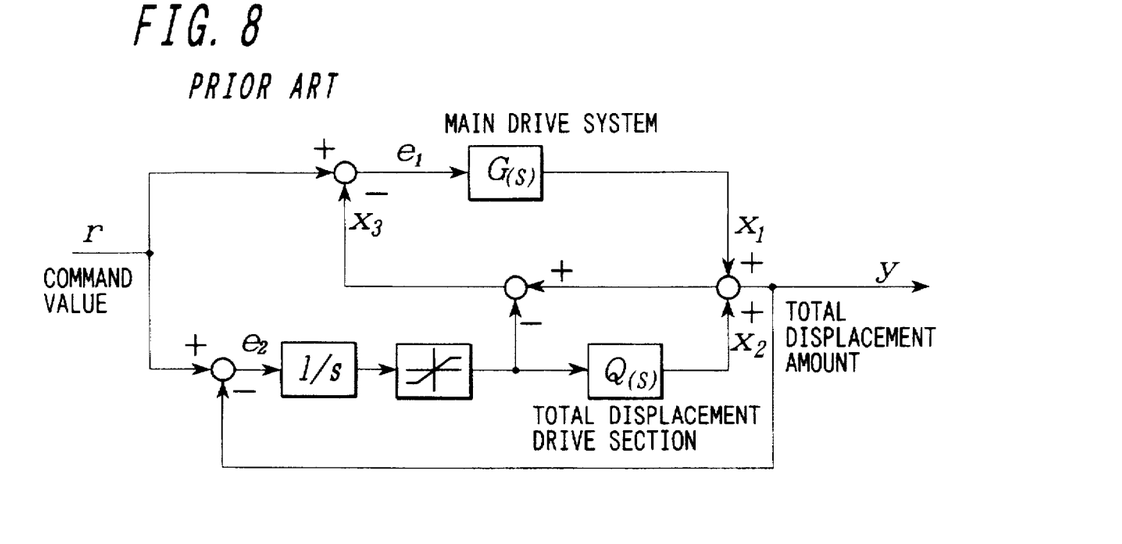
FIG. 8 is a block diagram showing a fourth example of a conventional composite servo system.

A block diagram of this system is shown in FIG. 8. This is a positioning control system of a device having a main drive system P(s) and a fine displacement drive section Q(s). The total displacement amount y of the main drive system P(s) and the fine displacement drive section Q(s) is measured, the measured total displacement amount y is fed back to the fine displacement drive section, and the fine displacement drive section Q(s) is controlled based on the difference $e_2$ between the total amount of displacement y and the command value r. In addition, the difference obtained by subtracting a fine displacement drive section input amount corresponding to the displacement amount of the fine displacement drive section from the total displacement amount y is tripled and the product is fed back to the main drive system and the main drive system is controlled based on the difference $e_1$ between the product and the command value r.

(5) Coarse-fine Composite Servo System (See Collection of Papers L27 Read at the Autumn 1991 Congress of Japanese Society of Precision Engineering (Oct. 1, 1991)

Figure 9:
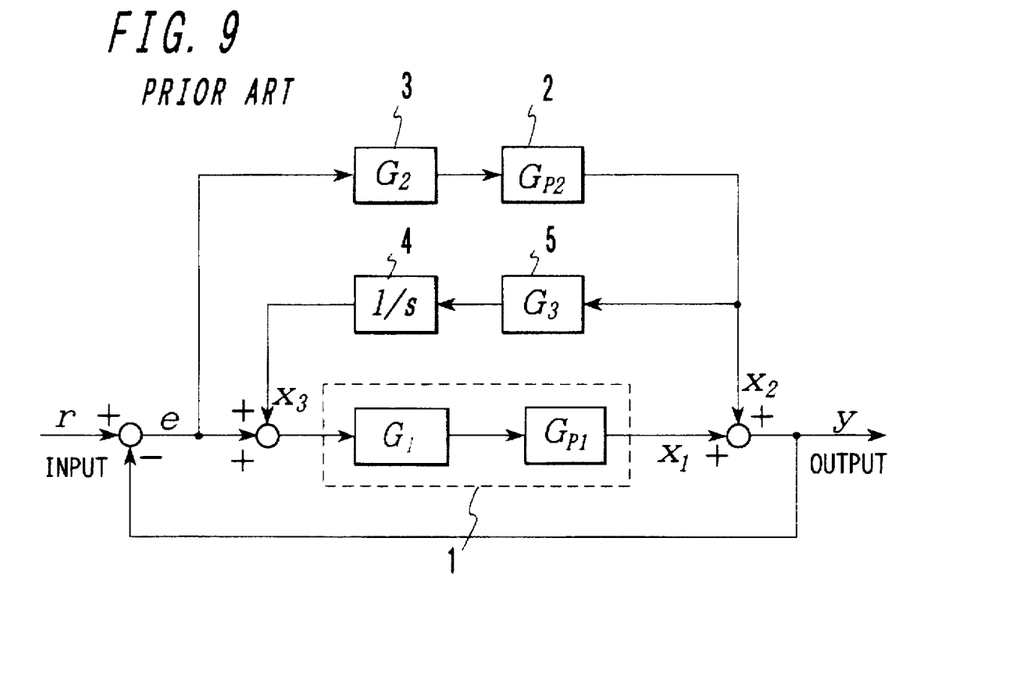
FIG. 9 is a block diagram showing a fifth example of a conventional composite servo system.

A block diagram of this system is shown in FIG. 9. This is a positioning control system of a device having a coarse moving table 1 and a fine moving table 2. The total displacement amount y of the coarse moving table 1 and the fine moving table 2 is measured, the difference e between the measured displacement amount y and the command value r is sent through a compensator 3 and applied to the fine moving table 2 as drive input, double the displacement of the fine moving table measured by a measurement means 5 is integrated by an integrator 4 and the sum of the difference e and the integrated value is applied to the coarse moving table as drive input.

(6) Positioning Control for Two Degrees of Freedom (See Electrical Association Technical Report (Section II) No. 378, Specialist Committee for Survey of Industrial Application of Robust Digital Control and Digital Control (August 1991))

Figure 10:
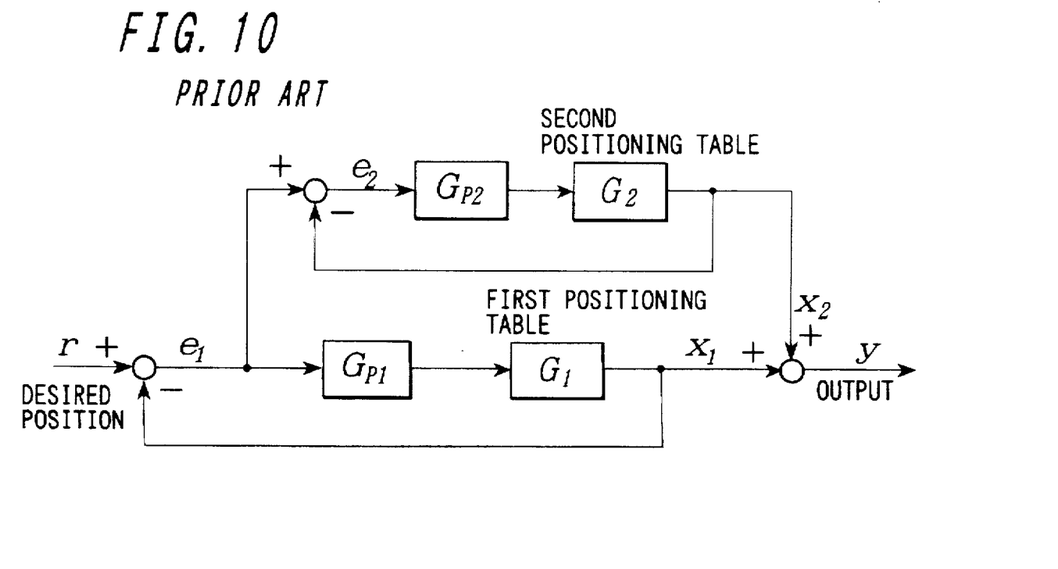
FIG. 10 is a block diagram showing a sixth example of a conventional composite servo system.

A block diagram of this system is shown in FIG. 10. A first positioning table $G_1$ is mounted on a second positioning table $G_2$ and the first table $G_1$ is controlled to reduce an error signal representing the difference $e_1$ between its desired position r and current position $x_1$ ($e_1=r-x_1$). Similarly, the second table is controlled to reduce an error signal representing the difference $e_2$ between the desired position r and current position $y=x_1+x_2(e_2=r-x_1-x_2)$.

(7) Research into High-precision Positioning of Cylindrical Grinder Spindle Wheel Stock (See Collection of Papers C22 Read at the 1992 Symposium of The Society of Grinding Engineers (Sep. 11, 1992)

Figure 11:
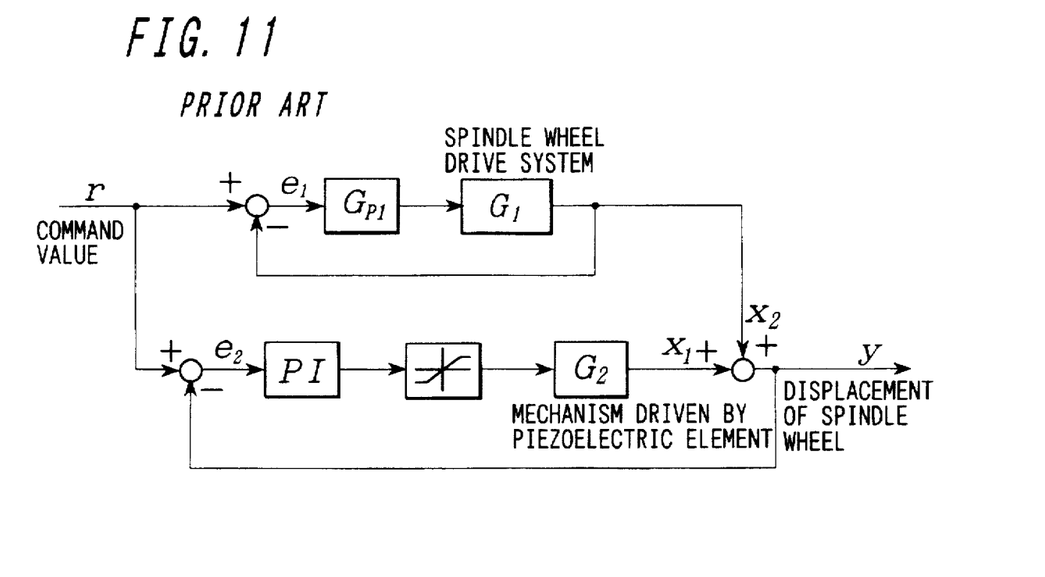
FIG. 11 is a block diagram showing a seventh example of a conventional composite servo system.

A block diagram of the subject system is shown in FIG. 11. The drive system $G_1$ of a cylindrical grinder spindle wheel stock servo-driven in an NC (numerical control) machine is combined with mechanism $G_2$ driven by a piezoelectric element between the nut of a ball screw and the spindle wheel stock. The difference between the displacement y of the spindle wheel stock and a command value r received from the NC machine is sent through a PI (proportional-integral) compensator and a limiter and applied as drive input to the piezoelectric element.

Requirements that remain to be satisfied by the aforesaid prior-art composite servo systems are as follows:

1) The stability of the control must be maintained without undesirable interference between the controls of the two positioners,
2) The fine positioner must effectively compensate for the low positioning resolution and slow response speed of the coarse positioner,
3) Displacement of the fine positioner up to the limit of its range of movement must be avoided to the utmost possible so as to maintain the compensation capability of the fine positioner, and
4) To achieve rapid home-in, no lost operation should occur during step response.

These requirements would be easy to meet if the characteristics of both the fine positioner and the coarse positioner were linear. In fact, however, both positioners are limited as regards displacement and the coarse positioner further exhibits nonlinear characteristics owing to the presence of a dead zone and changes in friction force. Because of this, composite servo systems designed on the premise of system linearity experience problems in actual operation. Specifically:

1) Owing to its dead zone, the coarse positioner is apt to home in on a position distant from the desired position, in which case the fine positioner has to compensate for all of the error. Since the fine positioner is therefore required to conduct its compensation operation about a center point that is distant from the center of its range of movement, it is likely to reach its displacement limit when a large displacement command is issued. As a result, it becomes impossible to conduct the compensation effectively.

2) An attempt to overcome this problem by providing the preadjuster of the fine positioner with an integrator so as to increase the gain in the low-frequency region results in lost operation since it leads to overshooting with respect to step inputs exceeding the displacement limit of the fine positioner and thus causes the maximum displacement to be maintained for some time after the total displacement has reached the desired value.

Although not attributable to system nonlinearity, the following problem also arises:

3) Displacement sensors are required for precision measurement of two among the three displacement values—the displacement of the fine positioner, the displacement of the coarse positioner and the sum of these displacements.

Of the prior-art systems listed above, the access servo system for magnetic disk drive (1), the light spot positioning apparatus (2) and the Coarse-fine Composite Servo System (5) are similar in that they cope with the problem 1) by adding the displacement of the fine positioner to the command signal of the coarse positioner. While the access servo system for magnetic disk drive (1) and the light spot positioning apparatus (2) add the displacement of the fine positioner to the command signal of the coarse positioner without modification, however, the Coarse-fine Composite Servo System (5) passes the displacement of the fine positioner through an integrator before adding it to the command signal of the coarse positioner, thereby controlling the coarse positioner so as to bring the displacement of the fine positioner nearer the center of the range of movement. In other words, the prior-art Coarse-fine Composite Servo System (5) operates to bring the coarse positioner closer to the desired value by using an integrator to accrue the slight displacements of the fine positioner and supplying the coarse positioner with a command signal of a magnitude exceeding its dead zone.

The light spot positioning apparatus (3), the Positioning Control for Two Degrees of Freedom (6) and the Research into High-precision Positioning of Cylindrical Grinder Spindle Wheel Stock (7) are similar or equivalent systems having no positive countermeasure for achieving the requirement 1).

Figure 12:
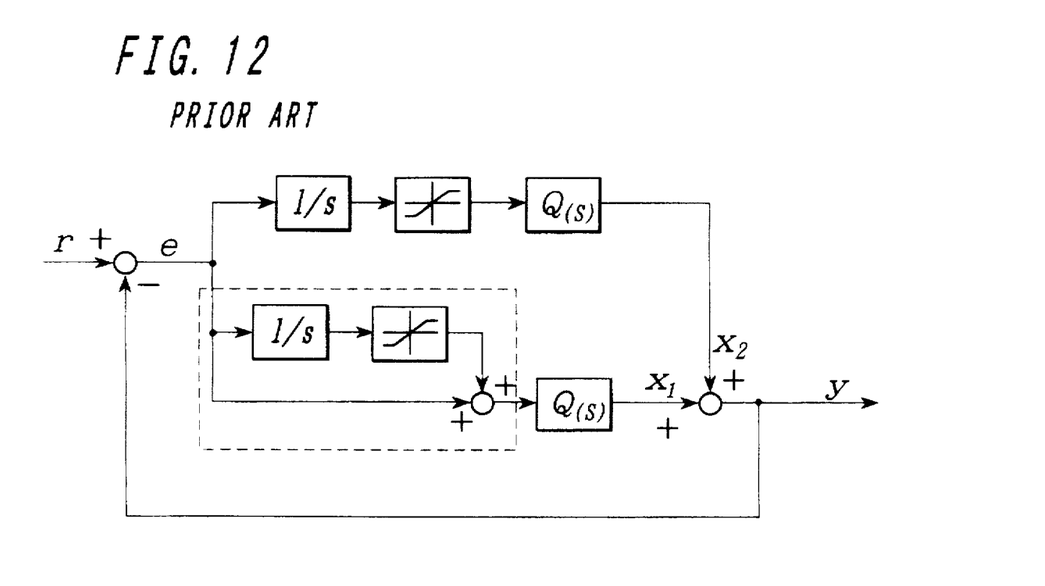
FIG. 12 is a block diagram of a system equivalent to that of the fourth example of FIG. 8.

The characterizing feature of the precision positioning control system (4) is that it does not directly detect the displacement of the fine positioner but, based on the assumption that the transfer characteristic of the fine positioner is substantially unity, adds this to the input of the coarse positioner in place of the displacement signal of the fine positioner. This system can be converted to the equivalent shown in FIG. 12, from which it can be seen to be a system similar to that of the light spot positioning apparatus (3) with no connection between the displacement of the fine positioner and the command signal of the coarse positioner. Owing to the presence of the integrator in the preadjuster, however, the system has the problem 2). Specifically, since the integrated value of the error e between the desired value r and the total displacement y is used as the command signal of the fine positioner, the command signal of the fine positioner remains positive for some time even after the total displacement y exceeds the desired value r and, therefore, lost operation and time loss arises before the system can home in.

Figure 13:
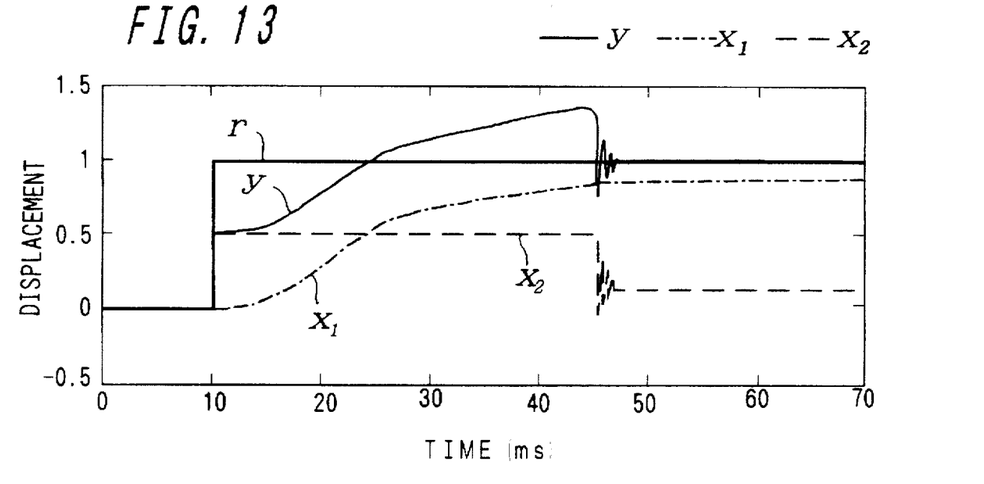
FIG. 13 is a graph showing an example of the response of a prior-art composite servo system to command signals.

FIG. 13 shows the results obtained when this operation was analyzed by simulation. As can be seen from FIG. 13, lost operation occurs during the period when the total displacement y exceeds the desired value r (the circled period).

Only the prior-art precision positioning control system (4) overcomes this problem.

The object of the present invention is to overcome the aforesaid problems of the conventional technologies relating to coarse-fine coordinating type composite servo systems by providing a precision positioning control apparatus and method which enable rapid homing in on the desired value by i) detecting only the total of the individual displacements of the coarse positioner and the fine positioner, which is the final subject of the control, ii) moving the coarse positioner having the dead zone as near as possible to the desired position, and iii) conducting no lost operation with respect to a stepwise command exceeding the displacement limit of the fine positioner.

SUMMARY OF THE INVENTION

The invention achieves this object by providing a precision positioning control apparatus comprising:

a coarse positioner displaced by a first adjusted command signal;

a fine positioner displaced together with the coarse positioner by a second adjusted command signal and having a smaller range of displacement but a higher positioning resolution than the coarse positioner;

a displacement totalizer for totaling a displacement of the fine positioner and a displacement of the coarse positioner;

total displacement detection means for producing a total displacement signal based on an output of the displacement totalizer;

a comparator for producing an error signal representing a difference between the total displacement signal and an original command signal;

a coarse positioner adjuster for adjusting the error signal output by the comparator and inputting the first adjusted signal to the coarse positioner, the coarse positioner adjuster including a gain element which imparts gain to the error signal, a transfer element responsive to an output of the gain element for simulating a frequency characteristic of the fine positioner, a limiter responsive to an output of the transfer element for simulating a displacement limit of the fine positioner, an integrator for integrating an output signal of the transfer element, a gain adjuster for adjusting an integrated output signal from the integrator and an adder which adds an output of the gain adjuster to the error signal and outputs the first adjusted command signal; and a fine positioner adjuster for adjusting the error signal from the comparator and inputting the second adjusted signal to the fine positioner, the fine positioner adjuster being constituted as a constant gain element.

The invention further provides a precision positioning control method conducted using a precision positioning control apparatus including a coarse positioner displaced by a first adjusted command signal, a fine positioner which has a higher positioning resolution than the coarse positioner and is displaced by a second adjusted command signal, a displacement totalizer for totaling a displacement of the fine positioner and a displacement of the coarse positioner, total displacement detection means for producing a total displacement signal based on an output of the displacement totalizer, a comparator for producing an error signal representing a difference between the total displacement signal and an original command signal, a coarse positioner adjuster for adjusting the error signal output by the comparator and inputting the first adjusted signal to the coarse positioner, the coarse positioner adjuster including a transfer element and a limiter for simulating a response characteristic of the fine positioner as a combination of a linear element and a displacement limit, an integrator for integrating an output signal of the limiter, a gain adjuster for adjusting a gain of an integrated signal from the integrator and an adder which adds an output of the gain adjuster to the error signal and outputs the first adjusted command signal, and a fine positioner adjuster for adjusting the error signal from the comparator and inputting the second adjusted signal to the fine positioner, the method comprising the steps of detecting the total of the displacements of the fine positioner and the coarse positioner, comparing the detected total with the original command signal to obtain the error signal, supplying the error signal to the coarse positioner adjuster and the fine positioner adjuster, supplying the first adjusted command signal output from the coarse positioner adjuster to the coarse positioner and supplying the second adjusted command signal output from the fine positioner adjuster to the fine positioner.

The coarse-fine coordinating type composite servo apparatus according to the invention inputs to the coarse positioner a signal obtained by adding to the error between the total displacement and the displacement command value an error adjustment amount, whereby it need detect only the total of the displacements of the coarse positioner and the fine positioner, further prevents the displacement of the fine positioner from reaching its limit by displacing the coarse positioner (which has a dead zone) as close to the desired position as possible, and responds to a stepwise command exceeding the displacement limit of the fine positioner by rapidly homing in on the target value without lost operation.

The above and other features of the present invention will become apparent from the following description made with reference to the drawings.

DESCRIPTION OF THE PREFERRED EMBODIMENT

Figure 1:
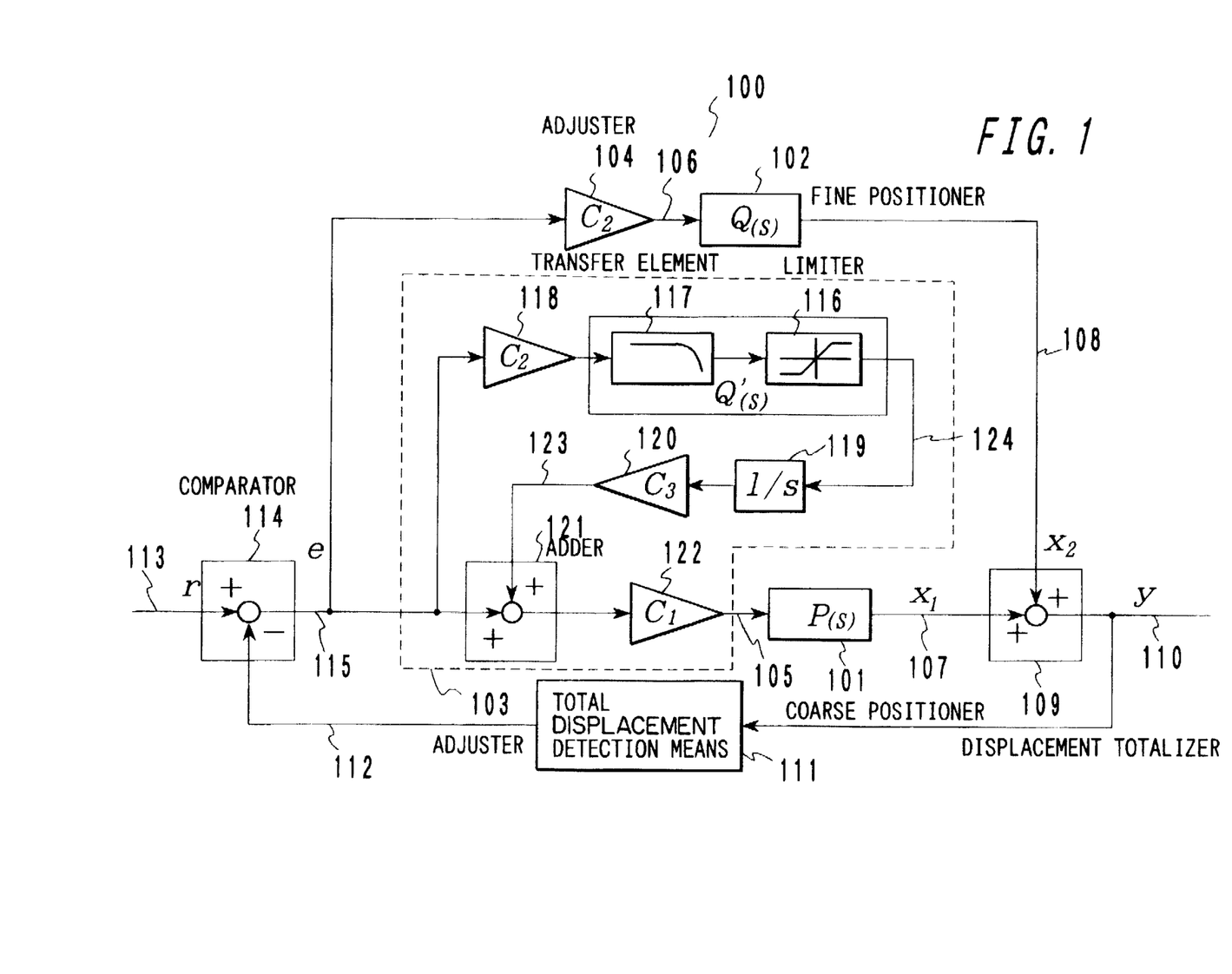
FIG. 1 is a block diagram of a precision positioning control apparatus according to the invention.

FIG. 1 is a block diagram of a precision positioning control apparatus 100 according to the invention. As illustrated, the apparatus 100 has a coarse positioner 101, a fine positioner 102, a displacement totalizer 109, a total displacement detection means 111, a comparator 114, a coarse positioner adjuster 103 and a fine positioner adjuster 104. The coarse positioner 101, which is driven by a servo motor or the like, has a large range of movement, a relatively low positioning resolution, and a relatively slow response speed. Its command signal is a velocity command. The velocity command input to the coarse positioner 101 has a dead zone caused by friction etc. The fine positioner 102 is driven to produce movement by a piezoelectric actuator or the like. It has a limited range of movement but its resolution and response speed are superior to those of the coarse positioner. The coarse positioner adjuster 103 is an element that produces a coarse positioner command signal 105 input to the coarse positioner 101, and the fine positioner adjuster 104 is an element that produces a fine positioner command signal 106 input to the fine positioner 102. The fine positioner adjuster 104 constitutes a gain adjusting element for ensuring the stability of the fine positioner response. Gain adjustment is necessary because an excessively large gain causes the response of the fine positioner to become unstable, results in overshooting and destabilizes the control system as a whole, while an excessively small gain slows the response speed, making it impossible to achieve sufficient compensation. The fine positioner adjuster 104 therefore operates to select the largest possible gain that does not cause overshooting of the fine positioner response.

The displacement 107 of the coarse positioner 101 and the displacement 108 of the fine positioner 102 are added together in the displacement totalizer 109 and the sum is output as the total displacement 110 (y in FIG. 1). The total displacement detection means 111 converts the total displacement 110 to a total displacement signal 112 which the comparator 114 compares with a position command signal 113 (r in FIG. 1). Based on the comparison, the comparator 114 outputs an error signal 115 (e in FIG. 1). The error signal 115 is input to the coarse positioner adjuster 103 and the fine positioner adjuster 104.

The coarse positioner 101 can, for example, be a movable table driven by a feed screw which converts the rotary motion of a servo motor to linear motion. The fine positioner 102 can, for example, be an elastic support guide mechanism mounted on the movable table and driven by a piezoelectric actuator. The displacements 107 and 108 of the fine positioner and the coarse positioner need not be individually detected. The displacement totalizer 109 can be established by stacking the coarse positioner 101 and the fine positioner 102. The total displacement detection means 111 can, for example, be a laser gage interferometry displacement sensor.

The configuration of the coarse positioner adjuster 103, which is a characterizing feature of the invention, will now be explained in detail. The coarse positioner adjuster 103 is an element which receives the error signal 115 as input and outputs the coarse positioner command signal 105. It comprises a limiter 116 which simulates the displacement limit of the fine positioner, a transfer element 117 that simulates the frequency characteristic of the fine positioner, a gain element 118 that simulates the transfer characteristic of the fine positioner adjuster 104, an integrator 119, an adjustment signal gain adjuster 120, an adder 121 and a coarse positioning loop gain adjuster 122.

The amplification by the gain element 118 is set equal to that by fine positioner adjuster 104 so that the output 124 of the system (116, 117) that simulates the fine positioner 102 is equal to the displacement 108 of the fine positioner 102. The transfer element 117 simulates the frequency characteristic of the fine positioner. Specifically, it simulates the actual fall in the response amplitude of the fine positioner with respect to the high frequency component of the output of the gain element 118 constituting the command signal. The limiter 116 simulates the displacement limit characteristic of the fine positioner. Specifically, it outputs a value corresponding to the maximum displacement of the fine positioner when the output of the transfer element 117 exceeds the range of displacement of the fine positioner. The integrator 119 integrates the output 124 of the limiter 116. The adjustment signal gain adjuster 120 adjusts the gain imparted to the integrated value of the signal 124 simulating the fine positioner displacement so as to bring the coarse positioner displacement closer to the desired position, thereby producing the effect of bringing the displacement of the fine positioner nearer the center of its range of displacement. The gain is therefore adjusted to secure this effect sufficiently without causing destabilization. The adder 121 adds the adjustment signal 123 from the adjustment signal gain adjuster 120 to the error signal 115 and outputs the sum as a command signal for moving the coarse positioner, which has come to be located away from the desired position owing to the dead zone caused by the friction and the like of the coarse positioner, to near the desired position. The coarse positioning loop gain adjuster 122 is a gain element for amplifying the output signal of the adder 121. Its gain is adjusted to secure the desired coarse positioner response characteristic and stability.

The gain-adjusted command signal 105 from the coarse positioning loop gain adjuster 122 is sent to the coarse positioner 101 for controlling its operation.

The positioning control by the precision positioning control apparatus 100 configured in the foregoing manner will now be explained.

The case where the position command signal 113 varies stepwise will be considered first. A change in the position command signal 113 produces a change in the error signal 115, which in turn induces a change in the coarse positioner command signal 105 applied to the coarse positioner 101, which begins to move. The response of the coarse positioner 101 is slow. The error signal 115 is further supplied through the fine positioner adjuster 104 to the fine positioner 102, which begins to move. Since the response speed of the fine positioner 102 is faster than that of the coarse positioner 101, a change immediately occurs in the total displacement 110. When the amount of change in the position command signal 113 is small and the magnitude of the error signal 115 is within the range of movement of the fine positioner, nearly all of the error is eliminated in a short time by the displacement of the fine positioner 102. As a result, the total displacement 110 follows the position command signal 113 at the high response speed of the fine positioner 102. On the other hand, the coarse positioner 101 receives the small remaining amount of the error signal 115. If the remaining amount of the error signal 115 is larger than the magnitude of the dead zone of the coarse positioner 101, the coarse positioner 101 begins to move. As the movement of the coarse positioner 101 progresses, in order to bring the total displacement 110 closer to the position command signal 113, the movement of the fine positioner 102 decreases, while the coarse positioner 101 moves closer to the position command signal 113 and stops when the coarse positioner command signal 105 becomes smaller than the dead zone of the input of the coarse positioner 101. The displacement 108 of the fine positioner at this time is maintained at an amount corresponding to the error between the displacement 107 and the position command signal 113.

In the case of the prior-art coarse positioner adjuster not having the limiter 116, the transfer element 117 for simulating the frequency characteristic of the fine positioner, the gain element 118 for simulating the transfer characteristic of the fine positioner adjuster, the integrator 119 and the control signal gain adjuster 120 provided in the coarse positioner adjuster 103 of this invention, the operation reaches equilibrium at this point and the fine positioner 102 stations itself at a position apart from the center of its range of movement. When the elements 116, 117, 118 and 119 are provided, however, the coarse positioner 101 receives an additional command which moves it still closer to the position command signal 113. More specifically, the limiter 116 produces the signal 124 simulating the displacement 108 of the fine positioner 102, and this signal 124, which simulates the displacement 108 of the fine positioner now being maintained at a constant value, is integrated by the integrator 119. As a result, the adjustment signal 123 rises gradually until the coarse positioner command signal 105 eventually rises to greater than the input dead zone of the coarse positioner 101. Thus the precision positioning control apparatus according to the invention operates to situate the fine positioner near the center of its range of movement.

It will now be explained how rapid home-in is achieved without lost operation when the amount of change in the position command signal 113 is greater than the range of movement of the fine positioner.

In the case of a step input representing an amount of change in the position command signal 113 that is larger than the range of movement of the fine positioner, i.e., when the error signal 115 is greater than the range of movement of the fine positioner, the fine positioner 102, owing to its rapid response, is immediately displaced to the limit of its range of movement by the error signal 115. The displacement 107 of the coarse positioner also increases in accordance with the response speed of the coarse positioner 101, so that the total displacement 110 eventually becomes equal to the position command signal 113. Although the coarse positioner 101 thereafter continues to increase its displacement owing to its inertia, the polarity reversal of the error signal 115 caused by the overshoot immediately decreases the displacement of the fine positioner 102 so that the total displacement 110 is maintained equal to the position command signal 113.

When the position command signal 113 varies continuously, the foregoing operation is conducted continuously.

The operation of the composite servo system according to the invention was analyzed by simulation, with the results set out below.

Figure 2:
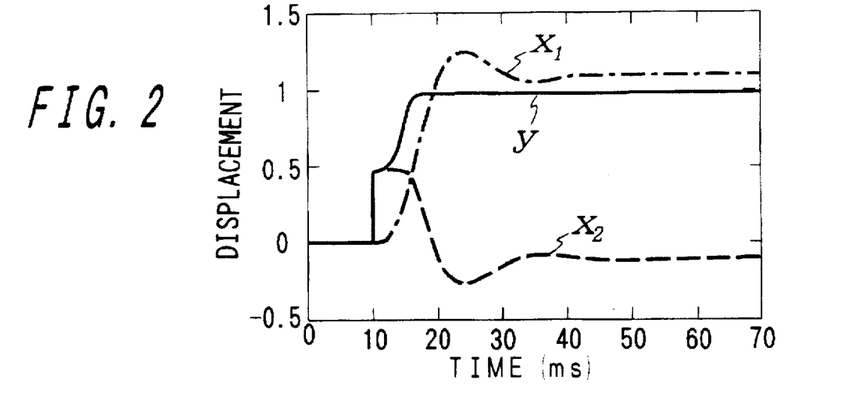
FIG. 2 is a graph showing an example of the response of a coarse positioner of the invention apparatus to a command signal.
Figure 3:
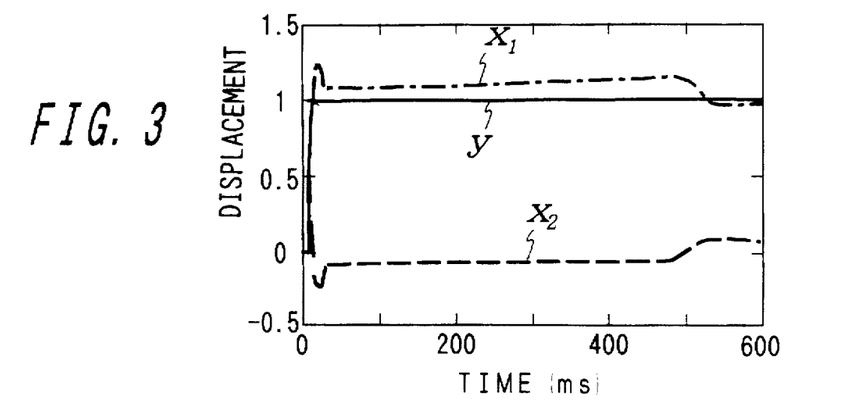
FIG. 3 is a graph showing an example of the response of fine positioner of the invention apparatus to a command signal.

FIGS. 2 and 3 show the response characteristics of the coarse positioner and the fine positioner to a position command signal 113 of unit magnitude under the conditions of: Coarse positioner:

$$P(s)=(1/s)\times\{0.0987/(s^2+0.3142s+0.0987)\},$$

and

Input dead zone width=+0.1,
Fine positioner:

$$Q(s)=119.9/(s^2+10.95s+119.9), \text{ and}$$

Displacement limit width=±0.5,
Gains of fine positioner adjuster 104 and gain element 118: 20.0,
Gain of coarse positioner adjuster 103: 0.8, and
Gain of adjustment signal gain adjuster 120: 0.003.

The single dot chain curve $x_1$ indicates the displacement 107 of the coarse positioner, the broken curve $x_2$ indicates the displacement 108 of the fine positioner, and the solid curve y indicates the total displacement 110. It can be seen that the precision positioning control apparatus achieves home-in with respect to a step input greater than the width of the range of movement of the fine positioner without lost operation. FIG. 3 shows the situation over a longer period of time. It can be seen that when the displacement $x_1$ of the coarse positioner exceeded the magnitude 1.0 of the position command signal, it was brought toward the signal 1.0 by the increased negative value of the adjustment signal $x_2$.

Figure 14:
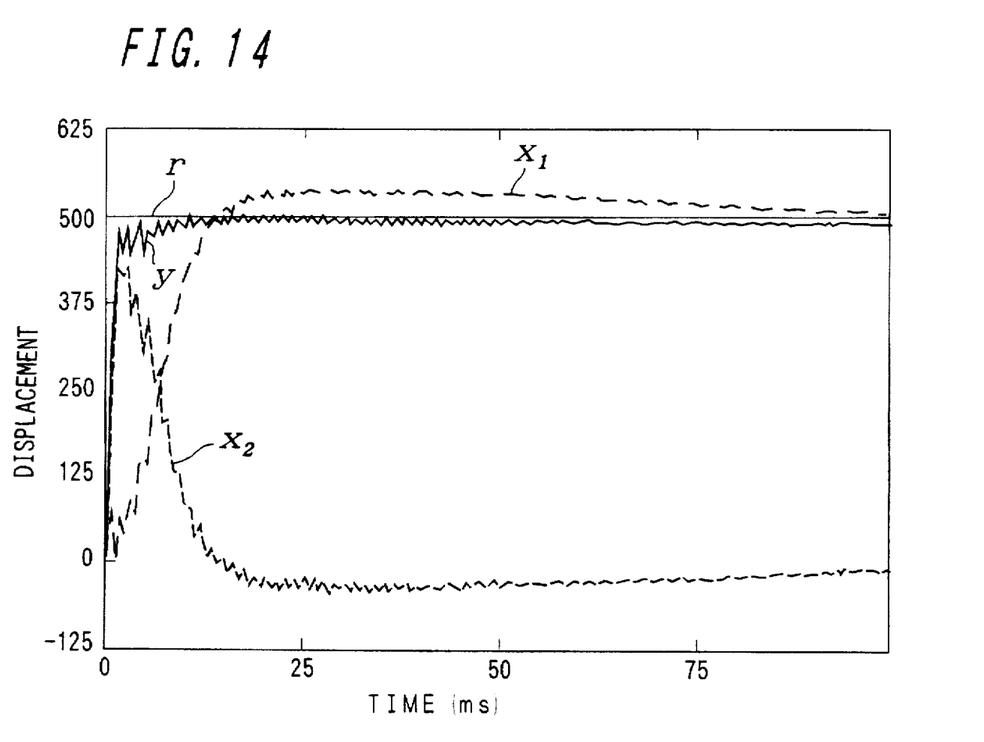
FIG. 14 is a graph showing an example of the response of the invention positioning control apparatus to a command signal.

The graph of FIG. 14 shows the change in displacement with time in a positioning control apparatus according to the invention wherein the coarse positioner was a movable stage mounted on a roller guided translation slide driven by a d.c. servo motor through a ball screw and the fine positioner was a stage mounted on the coarse positioner stage and driven by a laminated piezoelectric actuator.

The displacement of the coarse positioner and the total displacement were measured using a 2.5 nm resolution laser interferometer. Only the total displacement was used in the control.

The desired value was set at 500 nm (200 steps×2.5 nm) (curve r). The fine positioner began to move immediately after the displacement signal was sent to the coarse positioner and the fine positioner (curve $x_2$). When the coarse positioner began to move after a delay of about 3 ms (curve $x_1$), the displacement of the fine positioner decreased rapidly. When the displacement of the coarse positioner exceeded the desired value, the displacement of the fine positioner became negative, offsetting the coarse positioner overshoot. The curve y in this figure indicates the total displacement of the coarse positioner and the fine positioner. It can be seen that the apparatus homed in on the desired value while minimizing lost operation.

As explained in the foregoing, the coarse-fine coordinating type composite servo apparatus according to the invention detects only the total of the displacements of the coarse positioner and the fine positioner, prevents the displacement of the fine positioner from reaching its displacement limit by displacing the coarse positioner (which has a dead zone) as close to the desired position as possible, and responds to a stepwise command exceeding the displacement limit of the fine positioner by rapidly homing in on the target value without lost operation.

What is claimed is:

1. A precision positioning control apparatus comprising:
   a coarse positioner displaced by a first adjusted command signal;
   a fine positioner displaced together with the coarse positioner by a second adjusted command signal and having a smaller range of displacement but a higher positioning resolution than the coarse positioner;
   a displacement totalizer for totaling a displacement of the fine positioner and a displacement of the coarse positioner;
   total displacement detection means for producing a total displacement signal based on an output of the displacement totalizer;
   a comparator for producing an error signal representing a difference between the total displacement signal and an original command signal;
   a coarse positioner adjuster for adjusting the error signal output by the comparator and inputting the first adjusted signal to the coarse positioner, the coarse positioner adjuster including a gain element which imparts gain to the error signal, a transfer element responsive to an output of the gain element for simulating a frequency characteristic of the fine positioner, a limiter responsive to an output of the transfer element for simulating a displacement limit of the fine positioner, an integrator for integrating an output signal of the transfer element, a gain adjuster for adjusting an integrated output signal from the integrator and an adder which adds an output of the gain adjuster to the error signal and outputs the first adjusted command signal; and
   a fine positioner adjuster for adjusting the error signal from the comparator and inputting the second adjusted signal to the fine positioner, the fine positioner adjuster being constituted as a constant gain element.

2. A precision positioning control method conducted using a precision positioning control apparatus including a coarse positioner displaced by a first adjusted command signal, a fine positioner which has a higher positioning resolution than the coarse positioner and is displaced by a second adjusted command signal, a displacement totalizer for totaling a displacement of the fine positioner and a displacement of the coarse positioner, total displacement detection means for producing a total displacement signal based on an output of the displacement totalizer, a comparator for producing an error signal representing a difference between the total displacement signal and an original command signal, a coarse positioner adjuster for adjusting the error signal output by the comparator and inputting the first adjusted signal to the coarse positioner, the coarse positioner adjuster including a transfer element and a limiter for simulating a response characteristic of the fine positioner as a combination of a linear element and a displacement limit, an integrator for integrating an output signal of the limiter, a gain adjuster for adjusting a gain of an integrated signal from the integrator and an adder which adds an output of the gain adjuster to the error signal and outputs the first adjusted command signal, and a fine positioner adjuster for adjusting the error signal from the comparator and inputting the second adjusted signal to the fine positioner, the method comprising the steps of detecting the total of the displacements of the fine positioner and the coarse positioner, comparing the detected total with the original command signal to obtain the error signal, supplying the error signal to the coarse positioner adjuster and the fine positioner adjuster, supplying the first adjusted command signal output from the coarse positioner adjuster to the coarse positioner and supplying the second adjusted command signal output from the fine positioner adjuster to the fine positioner.

3. A precision positioning control method comprising the steps of:
   displacing a course positioner under control of a first adjusted command signal;
   displacing a fine positioner which has a higher positioning resolution than the course positioner under control of a second adjusted command signal;
   detecting a total displacement of the fine positioner and the course positioner and producing a total displacement signal;
   producing an error signal representing a difference between the total displacement signal and an original command signal;
   simulating a response characteristic of the fine positioner as a combination of a linear element and a displacement limit of the fine positioner, and outputting a simulation output signal;
   integrating the simulation output signal and producing an integrated signal;
   adjusting a gain of the integrated signal and producing an adjusted gain signal;
   adding the adjusted gain signal to the error signal and outputting the first adjusted command signal to the course positioner; and
   adjusting the error signal produced in the producing an error signal step and inputting the adjusted error signal as the second adjusted signal to the fine positioner adjuster.

* * * * *